United States Patent [19]
Austin et al.

[11] Patent Number: 5,135,651
[45] Date of Patent: Aug. 4, 1992

[54] SLUDGE DEWATERING SYSTEM

[75] Inventors: Eric P. Austin, Sandbach; Michael J. Gribbin, Newcastle, both of England

[73] Assignee: Simon-Hartley Limited, Staffordshire, England

[21] Appl. No.: 675,954

[22] Filed: Mar. 27, 1991

[30] Foreign Application Priority Data

Mar. 28, 1990 [GB] United Kingdom ............... 9006930

[51] Int. Cl.$^5$ .............................................. B01D 33/04
[52] U.S. Cl. ..................................... 210/396; 210/400
[58] Field of Search ....................... 210/396, 400, 401

[56] References Cited

U.S. PATENT DOCUMENTS

| | | | |
|---|---|---|---|
| 4,602,998 | 7/1986 | Goron | 210/400 |
| 4,609,467 | 9/1986 | Morales | 210/400 |

FOREIGN PATENT DOCUMENTS 1486345 9/1977 United Kingdom .

Primary Examiner—Ivars Cintins
Attorney, Agent, or Firm—Nies, Kurz, Bergert & Tamburro

[57] ABSTRACT

A sludge dewatering system comprising a moving foraminous belt (10) having a horizontal conveying run on which sludge is carried to permit drainage of water therefrom through the belt. In accordance with the invention a row of deflectors (12) are mounted on a pivotal cross beam (13) extending over the belt (10). Each deflector has a leading edge (19) and a pair of diverging and upwardly concave walls (21) whereby sludge proceeding along the conveying run of belt (10) is divided overturned and compressed by the deflectors.

7 Claims, 2 Drawing Sheets

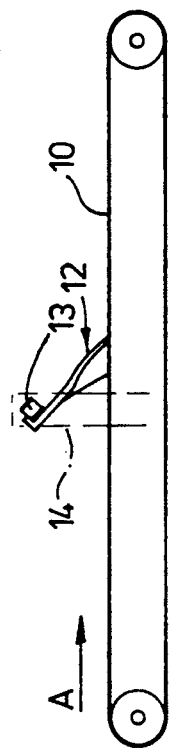
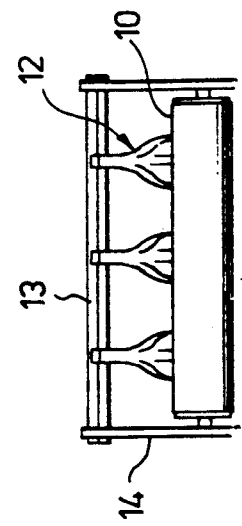
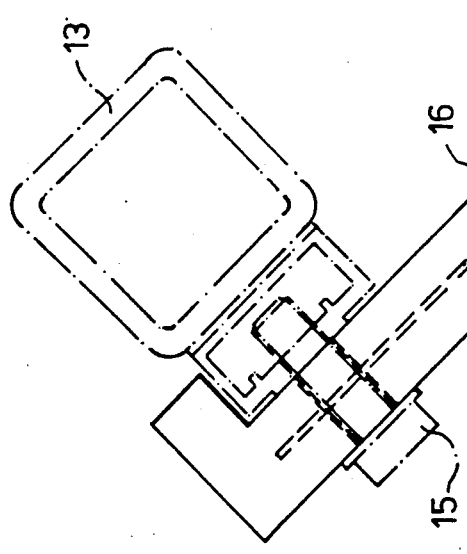
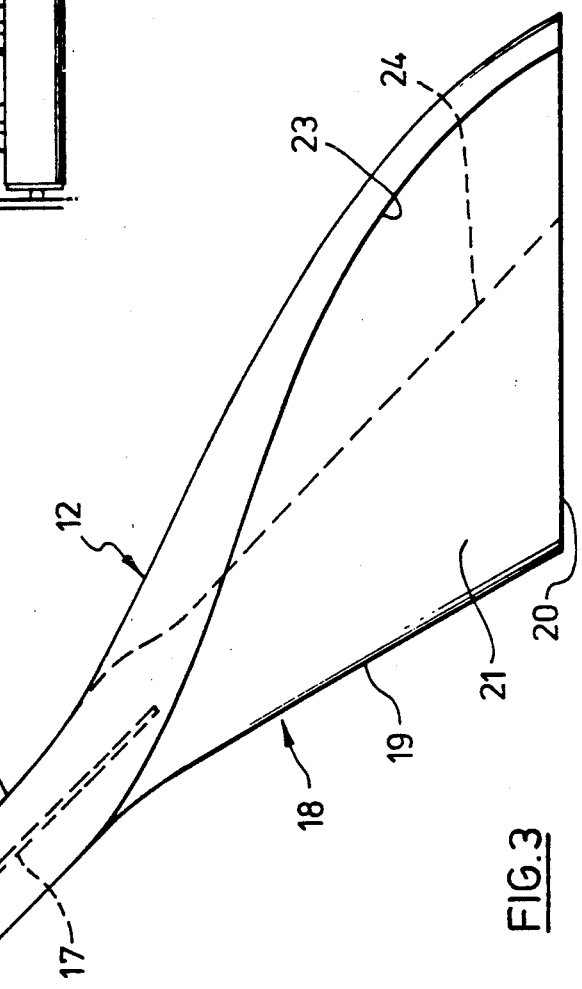

SLUDGE DEWATERING SYSTEM

The invention concerns a sludge dewatering system. The removal of water from chemically conditioned sludge using belt presses and gravity drainage belts is well known.

Various peripheral items have been incorporated into systems for this purpose, in order to assist in the removal by gravity of the released water. Such devices have been based largely on the deflection of the sludge as it is carried along a moving foraminous belt in order that water which is standing on the surface of the sludge and trapped within it released and allowed to pass downwardly through the belt for disposal or collection. This action produces a more concentrated sludge such that subsequent treatment such as pressure dewatering may be more economically carried out.

It is an object of the present invention to provide an improved sludge dewatering system in which not only is sludge deflection achieved, but the flow of sludge is divided by means which impart thereto a transverse and overturning motion thus causing relative movement of the solids in the sludge and in turn freeing more residual water.

According to the present invention there is provided a sludge dewatering system comprising a moving foraminous belt having a horizontal conveying run on which sludge is carried while water is permitted to drain from the sludge and to pass through the belt for collection, characterised in that in at least one location along the conveying run there is provided a deflector suspended just above or in contact with the belt to reside in a moving bed of sludge thereon; and in that the or each deflector comprises a leading edge to divide the sludge flow and a pair of diverging walls extending onwards from the leading edge to impart a transverse motion to the sludge and extending upwardly to provide a concave undersurface to impart an overturning motion to the sludge.

Preferably, two or more transverse rows of said deflectors are provided in stationary succession along the conveying run with the deflectors of each run misaligned with respect to those of the next previous or succeeding row whereby substantially the entire transverse extent of the bed of sludge encounters at least one of said deflectors to be divided and overturned thereby.

An embodiment of the invention will now be described, by way of example only, with reference to the accompanying drawings, in which:

FIG. 1 is a schematic side elevation of a sludge dewatering system incorporating deflectors made in accordance with the invention;

FIG. 2 is an end view thereof taken in the direction of arrow A in FIG. 1;

FIG. 3 is an enlarged side elevation of one of said deflectors; and

Figure 4:
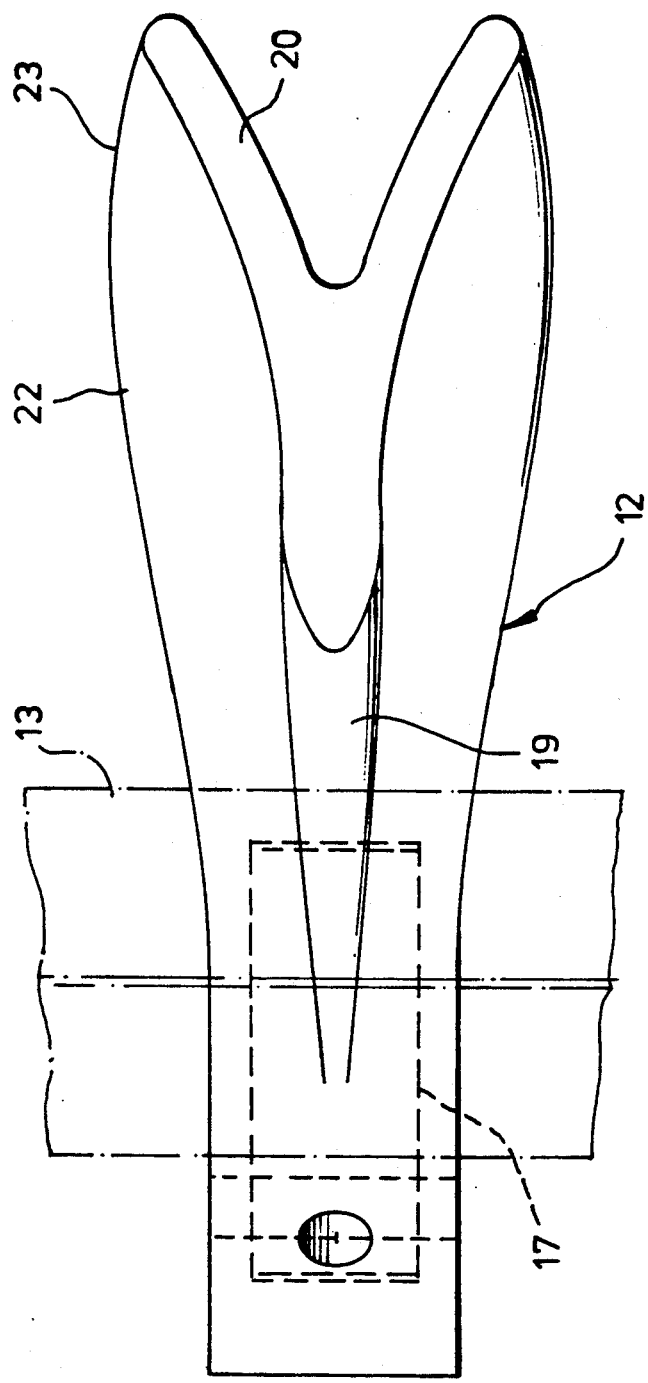
FIG. 4 is an underside view thereof.

FIG. 1 simply illustrates an endless conveying belt 10 which has a foraminous surface for carrying a bed of sludge along its upper run in the direction of arrow A. Means (not shown) will be provided to deposit onto the belt 10 chemically conditioned sludge in a continuous bed extending across the belt between a pair of side guides, and to collect dewatered sludge from the downstream end. During passage of the bed of sludge along the belt 10, residual water drains through the foraminous belt for collection or disposal. Thus, the sludge leaves the downstream end of the conveying run of the belt substantially dewatered, and is collected thereat for further treatment.

In accordance with the invention, in at least one location along the conveying run of belt 10 there is provided a row of stationary deflectors 12. Each deflector is rigidly mounted on a cross beam 13 which extends transversely over the belt between a pair of side frame members 14. The deflectors 12 are preferably attached to beam 13 by bolts 15 (see FIG. 3).

The deflectors are moulded from a partially resilient plastics material and comprise an upper stem 16 in which is embedded a steel plate 17 for rigidity. Extending downwardly from the underside of stem 16 is a bow member 18 presenting a leading edge 19 which is inclined at an angle which is preferably between 25° and 60° to its base 20. In use, the base 20 rests on, or is suspended just above the surface of belt 10. A pair of diverging walls 21 extend onwards and outwardly from the leading edge 19, and the walls extend upwardly to provide a concave undersurface illustrated at 22 in FIG. 4, terminating in upper diverging edges 23. The flat base 20 extends from leading edge 19 to the outer bottom edges of the walls 21, and as can be seen in FIG. 4 the base divides part way along its length to present an open valley 24 centrally on the upper surface of the deflector.

In use therefore, as the bed of sludge encounters a row of such deflectors it is divided by each leading edge 19 and the walls 21 impart a transverse motion to the sludge. Also, since the bed of sludge is typically of a depth which places its surface approximately half-way up leading edge 19 of each deflector, the concave undersurfaces 22 of the walls 21 impart an overturning motion to the sludge in combination with the transverse motion thus pressure is applied in a downwardly transverse direction. Immediately behind each deflector in the direction of travel of the sludge the belt 10 is therefore left substantially clear of sludge so that surface water released from the sludge by the transverse overturning motion may drain freely through those parts of the belt which are thus left clear. The mechanical effect on solid particles within the sludge is such as to impart relative movement thereto which causes tighter packing of the particles, squeezing them together and thus releasing further water which might otherwise remain trapped.

Preferably, at least one further row of deflectors is provided downstream of the first row with the deflectors of each subsequent row being misaligned with respect to those of the immediately preceding row. In this way, the entire bed of sludge is caused to encounter at least one of the deflectors.

For convenience, the beam 13 of each row of deflectors is pivotally mounted in its associated side frame members 14 whereby each row of deflectors may be pivoted upwardly to an inoperative position above the belt, either for maintenance or to enable selected rows of deflectors to be operative as required and in accordance with the prevailing conditions of the sludge.

We claim:

1. A sludge dewatering system comprising a moving foraminous belt having a horizontal conveying run on which sludge is carried while water is permitted to drain from the sludge and to pass through the belt for collection, and further comprising, in at least one location along the conveying run a stationary deflector suspended just above or in contact with the belt to reside in a moving bed of sludge thereon, said deflector having a base generally parallel to the belt and an inclined leading edge to divide the sludge flow, and with a pair of diverging walls extending onwards from the inclined leading edge to impart a transverse motion to the sludge, and extending upwardly from the base to provide a concave undersurface to impart an overturning motion to the sludge.

2. A sludge dewatering system according to claim 1, including two or more transverse rows of deflectors disposed in succession along the conveying run with the deflectors of each row misaligned with respect to those of the next previous or succeeding row.

3. A sludge dewatering system according to claim 1, wherein the or each deflector is mounted on a cross beam extending over the belt between a pair of side frame members, said deflector being movable to an inoperative position away from the belt surface.

4. A sludge dewatering system according to claim 3, wherein each deflector is removably attached to its associated cross beam, the latter being mounted pivotally on said side frame members for rotation about an axis extending transversely over the belt.

5. A sludge dewatering system according to claim 1, wherein the or each said deflector comprises an upper stem from which depends a bow member presenting a leading edge which is inclined at an angle greater than 25° to its base.

6. A sludge dewatering system according to claim 1, wherein the or each deflector is made from a partially flexible material having embedded therein a reinforcing plate.

7. A sludge dewatering system according to claim 1, wherein the base of the or each deflector divides part way along its length to present an open valley centrally on the upper surface of the deflector.

* * * * *